(12) United States Patent
Frost (10) Patent No.: US 7,628,379 B2
(45) Date of Patent: Dec. 8, 2009

(54) MODULAR VALVE ASSEMBLY

(75) Inventor: Tim Frost, Chattanooga, TN (US)

(73) Assignee: Burner Systems International, Inc., Chattanooga, TN (US)

( * ) Notice: Subject to any disclaimer, the term of this patent is extended or adjusted under 35 U.S.C. 154(b) by 0 days.

(21) Appl. No.: 11/764,286

(22) Filed: Jun. 18, 2007

(65) Prior Publication Data

US 2007/0235680 A1 Oct. 11, 2007

Related U.S. Application Data

(63) Continuation of application No. 10/823,079, filed on Apr. 13, 2004, now Pat. No. 7,264,222.

(51) Int. Cl.
*F16K 31/02* (2006.01)
(52) U.S. Cl. .................. 251/129.22; 251/323
(58) Field of Classification Search ................ 251/11, 251/129.01, 129.22, 323
See application file for complete search history.

(56) References Cited

U.S. PATENT DOCUMENTS

| | | | | |
|---|---|---|---|---|
| 2,922,614 A * | 1/1960 | Nickells | ............... | 251/129.22 |
| 3,400,906 A * | 9/1968 | Stocklin | ............... | 251/11 |
| 3,454,258 A * | 7/1969 | Estes et al. | ............. | 251/129.22 |
| 4,223,692 A * | 9/1980 | Perry | ............. | 251/129.22 |
| 4,438,777 A * | 3/1984 | Pirkle | ............... | 251/11 |
| 4,523,605 A * | 6/1985 | Ohkata | ............... | 251/11 |
| 4,925,155 A * | 5/1990 | Carman | ............. | 251/129.22 |
| 4,973,024 A * | 11/1990 | Homma | ............... | 251/11 |
| 5,211,371 A * | 5/1993 | Coffee | ............... | 251/11 |
| 5,623,960 A * | 4/1997 | Kawamura et al. | ..... | 251/129.22 |
| 6,179,921 B1 * | 1/2001 | Ruffell et al. | ......... | 251/129.22 |
| 6,843,465 B1 * | 1/2005 | Scott | ............... | 251/129.06 |
| 2002/0171055 A1 * | 11/2002 | Johnson et al. | ............... | 251/11 |

\* cited by examiner

*Primary Examiner*—John Bastianelli
(74) *Attorney, Agent, or Firm*—Stephen J. Stark; Miller & Martin PLLC (57) ABSTRACT

A valve assembly provides a holder cantileveredly attached to a boss on an end cap to axially dispose an actuator and a poppet on an axis with a valve seat formed in the end cap. The actuator is preferably a shape memory alloy actuator. The end cap may be placed in line with a fluid system such as in a gas oven so that an electrical communication with an igniter is provided.

20 Claims, 6 Drawing Sheets

MODULAR VALVE ASSEMBLY

BACKGROUND OF THE INVENTION

This application is a continuation application depending from Ser. No. 10/823,079, filed Apr. 13, 2004 now U.S. Pat. No. 7,264,222.

FIELD OF THE INVENTION

The present invention relates to a modular valve assembly for use with fluid systems, and more specifically to a modular valve assembly utilizing a shape memory alloy actuator linearly driving a poppet axially relative to a valve seat with the actuator retained by a holder cantileverdly connected past the valve seat.

DESCRIPTION OF RELATED ART

For most gas appliances, solenoid valves or bimetal valves are utilized to provide for various flows and/or on-off capability. Bimetal valves include valves such as U.S. Pat. Nos. 4,508,314 and 4,671,484. These type valves typically rely on cantilevered bi-metal arm which moves a poppet from a valve seat upon initiation of a current about a coil 42 on the arm. Bimetal valves typically have a low seating force when in a closed configuration.

Solenoid valves generally employ a coil about a plunger wherein current through a coil moves the plunger relative to the coil. The plunger is connected to a poppet which is lifted from a valve seat upon the initiation of current. Solenoid valves also typically utilize a hold-open current to maintain the valve in an open position. Solenoid valves are often expensive, noisy and difficult to provide at a precise position.

Controlled valves such as U.S. Pat. Nos. 6,220,854 and 6,116,230 have been utilized with pulse width modulated control signals and U.S. Pat. No. 5,979,430 shows a supply device for a gas appliance manifold.

Nevertheless, there is believed to be a need for a quiet, small, and low-power valve assembly to replace prior art bimetal and solenoid actuated valve assemblies currently available. In that effort, PCT Patent Application No. PCT/ITO1/00219 published as WO 02/090807 A1 shows a proportional valve with a shape memory alloy actuator. This valve appears to be relatively complicated in design and operation.

A number of other attempts have been made to utilize shape memory alloys for actuators in valves.

U.S. Pat. No. 4,973,024 shows a valve driven by a shape memory alloy. This design requires a means responsive to the opening and closing movement of the valve element for the respective opening and closing of contacts to provide electricity through the shape memory alloy.

A number of patent applications have been filed by the Swagelok Company, including U.S. Pat. No. 6,247,678, WO01/133306 A2, US 2001/0011414 A1 and US 2001/0038082 A1. These patents and/or applications rely on a coil of shape memory alloy wrapped around about a stationary and a moveable member, so when the coil contracts it moves the moveable member to unseat the valve. This appears to be an effective but rather cumbersome type arrangement.

U.S. Pat. No. 5,865,418 utilizes a shape memory alloy for a valve actuator. This design provides for a normally open valve wherein upon energizing the shape memory alloy the valve can be closed.

International Publication No. WO02/090807 A1 shows a proportion valve with shape memory alloy actuator which utilizes a coiled shape memory alloy to unseat shutter 10 from a restricted area within the valve body.

U.S. Pat. No. 5,211,371 shows a linearly actuated valve which utilizes a biasing spring as electric conductor.

U.S. Pat. No. 6,279,869 and U.S. Pat. No. 6,494,225 show a proportional flow control valve with moveable pinch jaws that can compress or open a flow tube 26 to proportionally control the flow through the tube 26.

Shape memory alloys have also been utilized in a coil style such as is shown in U.S. Pat. No. 6,557,827 and as a way to drive a cam member as shown in U.S. Pat. No. 6,684,904.

Nevertheless, there is not believed to be a commercially marketed shape memory alloy driven valve assembly or a valve assembly which can work with other valve actuator types which can be utilized in a variety of environments.

SUMMARY OF THE INVENTION

A need exists to provide an improved valve assembly.

Another need exists to provide a valve assembly which is cantileveredly mounted to an end cap.

Another need exists for a valve assembly which preferably utilizes a shape memory alloy actuator which overcomes disadvantages of the prior art designs.

Another need exists for a valve assembly utilizing a valve actuator having a plurality of linearly displaceable shape memory alloy driven elements.

Another need exists for a modularly designed valve assembly.

Another need exists for a valve assembly having a unique plunger to actuator connection.

Another need exists for a valve assembly for use with a gas appliance which has an inherent built-in safety feature.

Another need exists for a valve assembly which relies on a control circuit as a portion of a safety system.

Another need exists for a valve assembly which can be attached in-line to a piping system.

Yet, another need exists for a valve assembly attached to an oven burner.

Accordingly, the presently preferred embodiment of the present invention provides a valve assembly having a holder cantileveredly attached to a boss of an end cap proximate to a valve seat formed into the boss of the end cap. The holder retains an actuator. The actuator linearly drives a poppet against the valve seat. The poppet is preferably constructed with a self guiding face. The poppet preferably receives an arrowhead shaped connector hook from the actuator. This unique connection allows for relatively easy replacement of the actuator and/or poppet. A spring is preferably utilized to bias the poppet against the valve seat to maintain the valve at a normally closed configuration. The actuator then overcomes the biasing force of the spring to open the valve. The preferred embodiment actuator is a series of shape memory alloy wires utilized to linearly displace the poppet from the valve seat. In the preferred embodiment, a Nanomuscle(™) type actuator device is utilized.

In the presently preferred embodiment, a housing is provided about the holder and an opposing end cap is provided opposite the holder from the first end cap. In this embodiment, the housed assembly can be inserted axially with a valve seat into virtually any fluid flow line.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

FIGS. 1-15 are directed to the presently preferred embodiment of the present invention. FIGS. 16-21 relate to alternatively preferred embodiments. Furthermore, while FIGS. 16-21 relate to alternatively preferred embodiments, still other embodiments may be provided utilizing the valve assembly as shown and described herein.

Figures 1, 2:
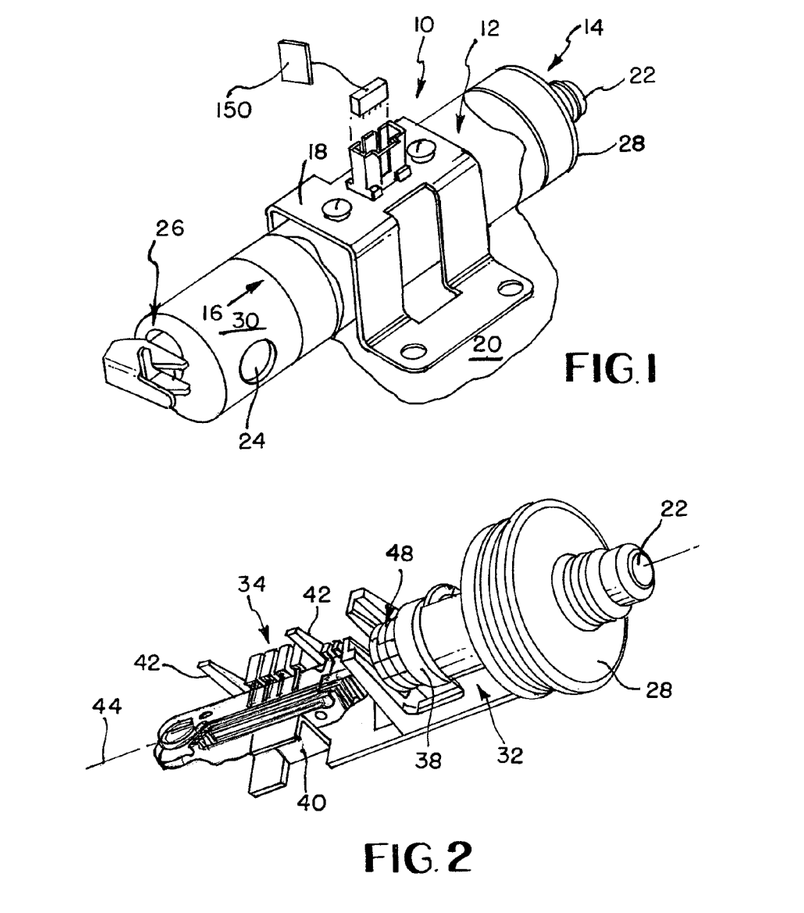
FIG. 1 is a top perspective view of a valve assembly of the presently preferred embodiment of the present invention shown having a housing connected to a surface and disposed between end caps of first preferred embodiments.
FIG. 2 is a side perspective view of a portion of the valve assembly shown in FIG. 1 with the first preferred end cap removed from the housing shown in FIG. 1.

FIG. 1 shows the valve assembly 10 having a housing 12 in the form of a tube having a proximal end 14 and a distal end 16. The housing 12 is secured by bracket 18 to a surface 20. The surface 20 could be a portion of an oven or other appropriate surface for which the valve assembly 10 would be useful. A fluid outlet 22 is provides with fluid from the valve assembly 10. The fluid enters through inlet 24. A manual shut off 26 is shown in use with this valve assembly 10 so that normal operation of the valve assembly 10 can be overridden such as in an emergency or for other reasons. A first end cap 28 is connected to the proximal end 14 of the housing 12. A second end cap 30 is provided at the distal end 16 of the housing 12. Each of these components will be discussed in further detail in reference to the individual components in the accompanying figures.

Figure 3:
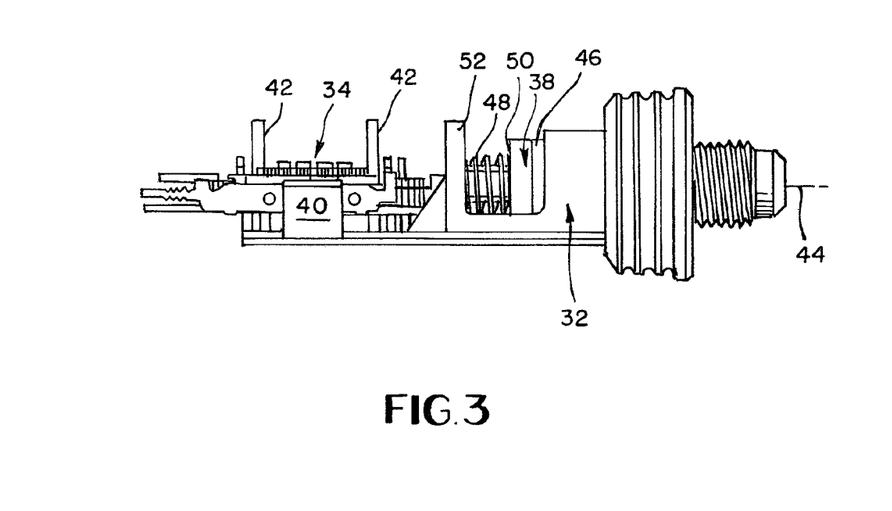
FIG. 3 is a bottom plan view of the portion of the valve assembly shown in FIG. 2.

FIG. 2 shows the first end cap 28 removed from the housing 12. In this view, the holder 32, the actuator 34, the biasing member illustrated as spring 36 and the poppet 38 are visible. FIG. 3 is a bottom view of the portion of the valve assembly 10 shown in FIG. 2. The actuator 34 is shown retained intermediate clip 40 and legs 42. In the preferred embodiment the actuator 34 is a shape memory alloy linearly actuating type actuator. The particular model illustrated is manufactured by Nanomuscle, Inc. Nanomuscle's part number NM125 with digital interface PCB. The company and part information is currently available at www.nonomuscle.com. This product utilizes a plurality of linearly moveable shape memory alloy members operably connected together wherein a total movement of the actuator is greater than a movement of any individual shape memory alloy member.

Other actuators including solenoid valve actuators, bimetallic valve actuators or others could also be utilized in other embodiments.

The applicant has found that the shape memory alloy (SMA) actuators such as the Nanomuscle(™) provide for a compact, quiet actuators that only require a low amount of power for initial opening. Furthermore, these type devices are designed for high repetitions. Shape memory alloys may be formed of nickel titanium such as Nitenol(™) or other material as is known in the art. Furthermore, a Nanomuscle(™) is only one type of shape memory alloy (SMA) actuator available on the market. There are believed to be numerous others.

Upon receipt of an electric signal, the shape memory alloy wires contract thereby pulling the poppet 38 from the valve seat 46. Upon removal of the signal, the shape memory alloy can return to its extended length. The bias of spring 48 can assist.

As can be seen from FIGS. 2 and 3, the clip 40 and legs 42 do not restrict linear movement along operational axis 44 of the actuator 34 and poppet 38 of the valve assembly 10. Accordingly, the actuator 34 can move the poppet 38 distally away from valve seat 46 to overcome bias of spring 48 to place the valve assembly 10 in an open configuration. This can be seen in better detail in FIG. 6 as will be explained in further detail below.

The spring 48 is preferably retained intermediate a back 50 of the poppet 38 and a shoulder 52 of the holder 32. In this configuration, the poppet 38 is biased by spring 48 against the valve seat 46. Upon initiation of the actuator 34 in the distal direction, the bias of the spring 48 is overcome so that the poppet 38 may be moved distally relative to the valve seat 46 to place the valve assembly 10 in an open configuration as explained in further detail as it relates to FIG. 6 below.

Figure 4:
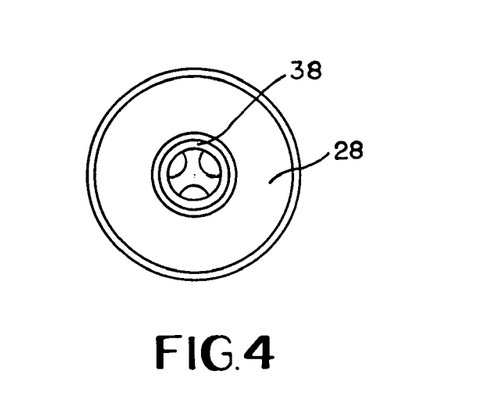
FIG. 4 is an end plan view of the portion of the valve assembly shown in FIGS. 2 and 3.

FIG. 4 shows the first end cap 28 from an end view with the poppet 38 seen through the valve inlet 24.

Figure 5:
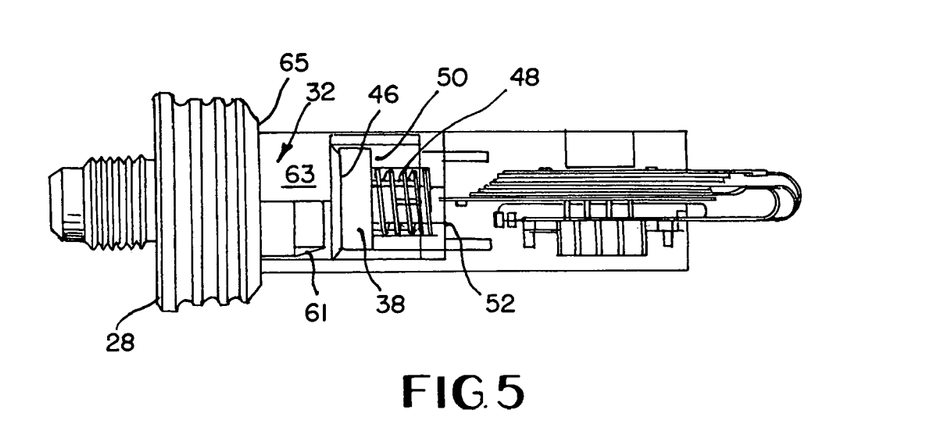
FIG. 5 is a side plan view of the portion of the valve assembly shown in FIGS. 2-4.

FIG. 5 shows the valve assembly 10 shown in FIGS. 2 and 3 from a side perspective. The end plug 28 is connected to the holder 32 as shown in FIG. 5.

Figure 8:
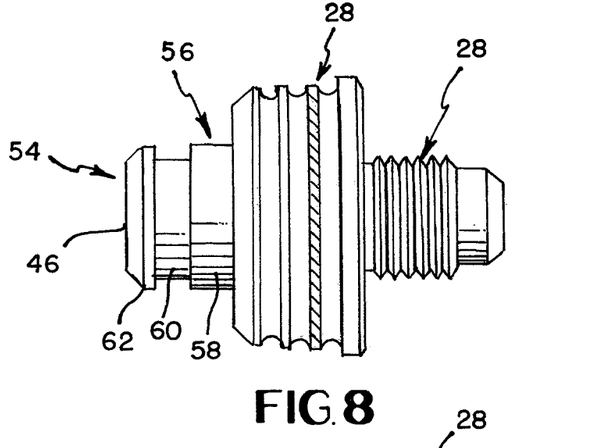
FIG. 8 is a side plan view of the first end cap shown in FIG. 1.

Referring to FIG. 8, the first end plug 28 is shown. The valve seat 46 extens from a face 54 of the first end plug 28. The valve seat 46 preferably extends from a boss 56 located at the face 54 of the end plug 28. The boss 56 is preferably comprised of a body 58 connected to a neck 60 which then connects to a head 62 which connects to the valve seat 46. The neck 60 is preferably of a smaller diameter than the body 58 or the head 62. This provides a channel 64 intermediate the head 62 and the body 58.

As can be seen in FIG. 5, the holder 32 has a flange 65 which extends into the channel 64 about the neck 60 so that the holder 32 connects to the boss 56 as illustrated in FIG. 5. In this manner, the remainder of the holder is substantially cantileveredly connected to the end plug 28 at the neck 60. The flange is a portion of foot 63 which contacts inner face 65 of first end plug 28. The poppet 38 is illustrated biased against the valve seat 46 in FIG. 5 by the spring 48 acting against the back 50 of the poppet intermediate the shoulder 52 of the holder 32.

Figure 6:
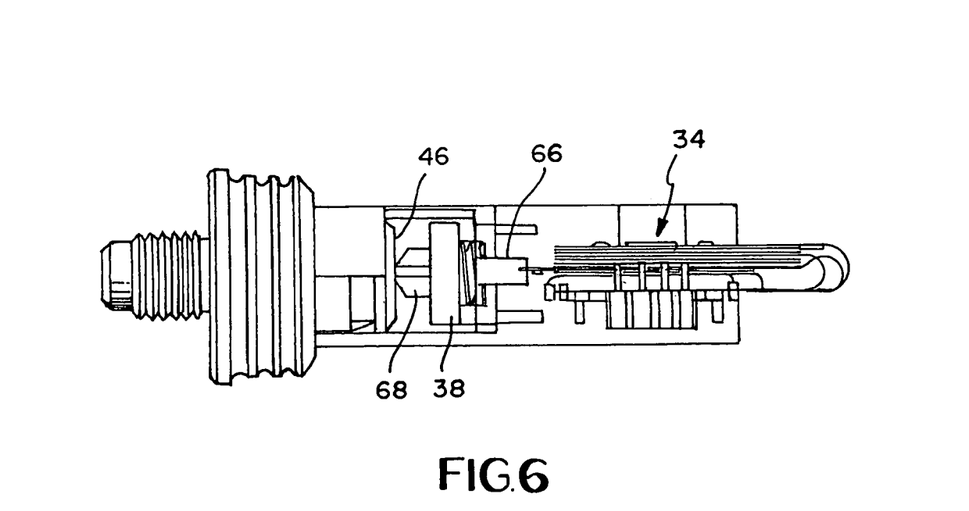
FIG. 6 is the portion of the valve assembly shown in FIG. 5 in an open configuration.
Figure 10:
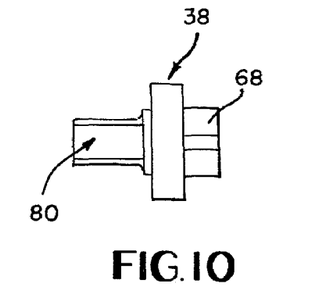
FIG. 10 is a partial cutaway view of the poppet shown in FIGS. 3-6.
Figures 11, 12:
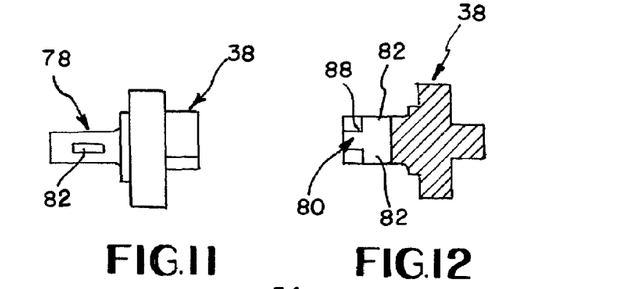
FIG. 11 is a top plan view of the poppet shown in FIG. 10.
FIG. 12 is a side cutaway view of the poppet shown in FIGS. 10 and 11.

FIG. 6 shows operation of the actuator 34 which pulls connector 66 which is received within a portion of the poppet 38 as will be explained in further detail in reference to FIGS. 10-12 along with FIG. 14. As the poppet 38 is pulled by the actuator 36 distally relative to the valve seat 48, the poppet 38 becomes unseated as shown in FIG. 6 and places the valve assembly 10 in an open configuration. A guide 68 is useful to assist in self-guiding the poppet 38 back into an appropriate seal against the valve seat 48 when the actuator 34 is disengaged so that the bias of the spring 48 may reseat the poppet 38 against the valve seat 46. Thus upon deactivation of the actuator 34 the bias of the spring 48 returns the valve to the configuration shown in FIG. 5 in the preferred embodiment.

Figure 7:
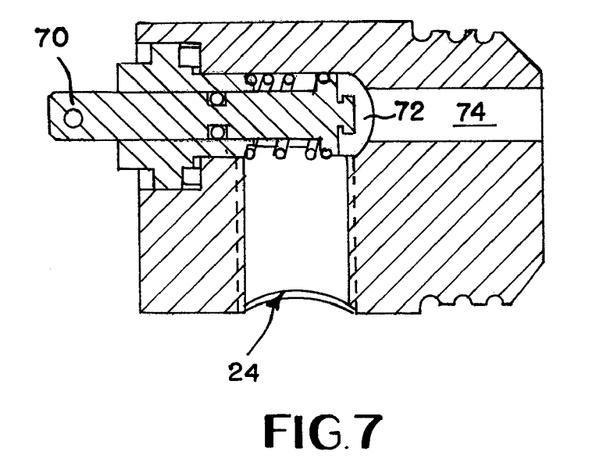
FIG. 7 is a cross-sectional view of the second end cap shown in FIG. 1.

FIG. 7 shows a second end cap 30. Specifically, a manual shut off valve 26 is shown in the shut position in FIG. 7. Post 70 has been driven proximally toward the proximal end 14 of the housing 12 so that seat 72 obscures or closes passage 74 to prevent flow through inlet 24 out passage 74. The post 70 may be withdrawn so that the seat 72 is disengaged from obstructing passage 74 in the normal configuration.

Figure 9:
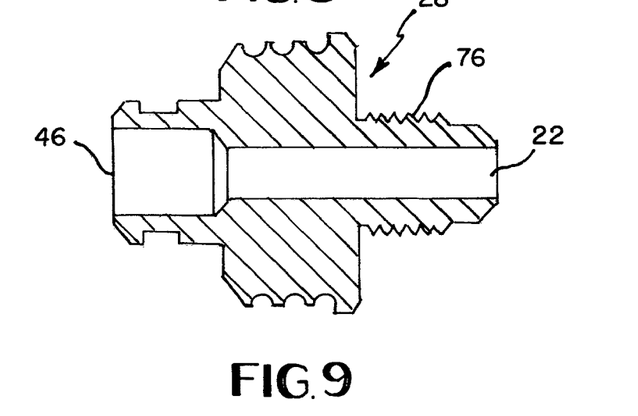
FIG. 9 is a cross-sectional view of the end cap shown in FIG. 8.

FIG. 9 is a cross section of the first end 28. Threads 76 assist in connecting the first end cap 28 to piping for an appropriate fluid such as gas, air or other appropriate fluid conductors such as a pipe, tube, etc. FIG. 9 shows flow from the outlet 22 has traveled past the valve seat 46. The outlet 22 and the valve seat 46 are in communication with one another through the first end cap 28. The pressure of the fluid from the inlet 24 can also assist in maintaining the valve assembly as in the normally closed configuration. FIGS. 10-12 show the poppet 38 having guide 68 extending therefrom. The guide preferably is equipped with an arm 78 which has a cavity 80 therein. The cavity 80 preferably communicates with slots 82 as shown in FIGS. 11 and 12. In FIG. 14, the connector 66 is illustrated. Connector 66 preferably is equipped with a hook 84 having barbs 86 so that the hook 84 passes at least through a portion of the cavity 80 and the barbs proceed into slots 82 and are retained by lip 88 of the poppet 38. The poppet 38 is preferably constructed of rubber or other appropriately flexible material so that a relatively rigid hook 84 may be inserted through the somewhat resilient poppet 38 and positioned as illustrated in FIGS. 5 and 6. This connection is believed to be novel in the art as it relates to actuators and poppets.

Figure 13:
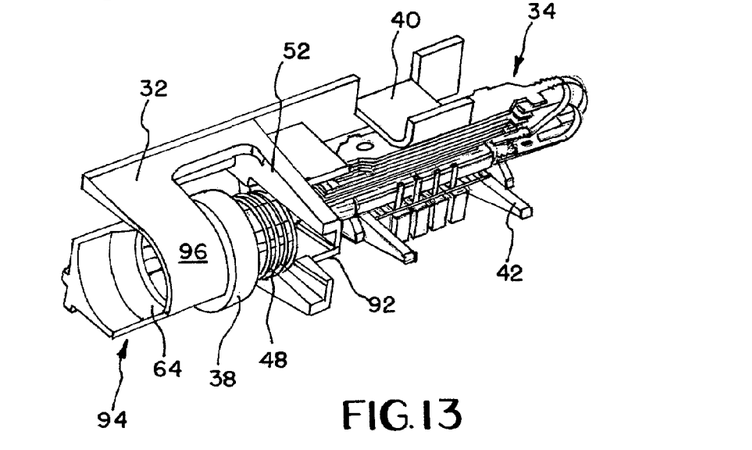
FIG. 13 is a bottom perspective view of the valve assembly shown in FIGS. 1-3 removed from the first end plug.
Figures 14, 15:
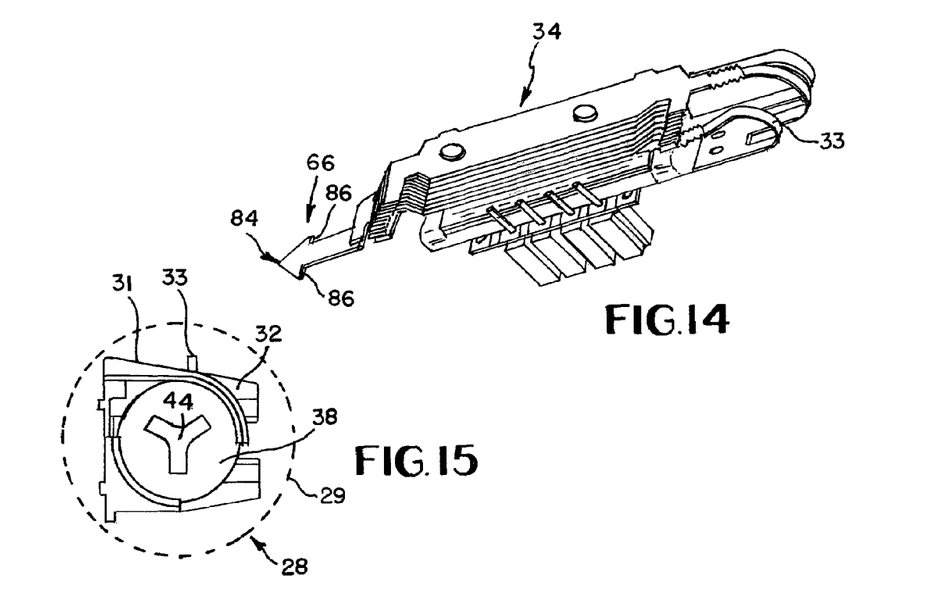
FIG. 14 is a side perspective view of the actuator removed from the holder shown in FIG. 13.
FIG. 15 is an end plan view of a portion of the valve assembly with the first end plug shown in phantom.

FIG. 14 shows a four pin electrical connection 90 of the actuator 34. The connection 90 communicates through the housing 12 to the actuator 34. An appropriate electric signal may be provided to the actuator 34 to move the poppet 38 relative to the valve seat 48. FIG. 13 shows a detailed view of the holder 32 removed from the first end cap 28. The flange 64 is visible in this view. By constructing the valve assembly 10 in the manner illustrated, the replacement holders 32 equipped with actuators 34 as shown in FIG. 13 can quickly and easily be replaced and/or installed in new valve assemblies 10. The holder 32 is molded of plastic and is easy to fabricate. Specifically, while providing a gap 92 in the shoulder 52, the actuator 34 may be connected to the poppet 38 with the spring 36 installed prior to making the connection. The connected poppet 38 to the actuator 34 can then be slid into position as shown in FIG. 13 with the spring appropriately placed relative to the shoulder 52. The actuator 34 can then be clipped and placed between the legs 42 and clip 40. Opening 94 and base 96 of the holder 32 allows for the holder 32 to be clipped onto a boss 56 with the valve seat 46 appropriately positioned as shown in FIGS. 2-6. The base 96 is shown contacting the face 54 of the end plug 28.

As shown in FIG. 15, the first end plug 28 is shown in phantom having a first perimeter 29 defining an area therein. The view of FIG. 15 is taken perpendicular to axis 44. The holder 32, the actuator 34 and the poppet 38 in the embodiment shown in FIG. 15 are all contained within a cross sectional area represented by an outer perimeter 31 of the holder 32 and the lead 33 extending from the actuator 34. In other embodiments, the holder 32 by itself may have the largest outer perimeter. The largest outer perimeter 31 of the combination of the holder 32, poppet 38 and actuator 34 as taken along a cross sectional plane perpendicular to a plane containing the largest outer perimeter 29 of the end plug 28 is contained within the outer perimeter 29. In fact, the cross sectional area defined by outer perimeter 31 is smaller than the cross sectional area defined by outer perimeter 29. Not only is the cross sectional area surrounded by perimeter 31 smaller than the perimeter 29, but it is also contained within a parallel plane to the axis 44. One advantage to being constructed in this manner in the preferred embodiment is that a plug could be inserted into a structure having an interior cross sectional void with the cross sectional area at least as large as the outer perimeter 29 of the end plug 28. During the insertion process the holder 32, actuator 34, and poppet 38 would not be prevented from being inserted during the process. In this manner, virtually any opening could be utilized to position a first end cap having a valve assembled in accordance with the presently preferred embodiment. As can be seen in FIG. 15, a first cross sectional area is parallel to the first cross sectional area of the end plug 28 as shown along axis 44 to place it in the same plane with the second cross sectional area. The second cross sectional area is contained within a parallel cross sectional area to the first cross sectional area as shown in FIG. 15.

Figure 16:
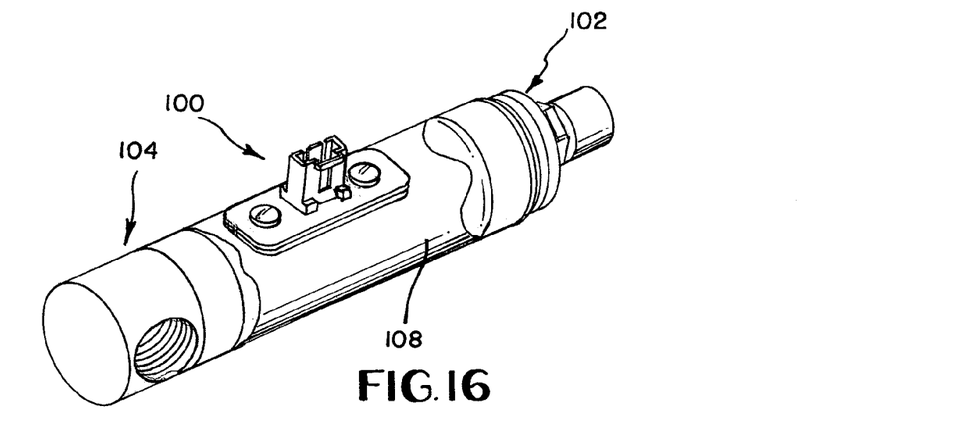
FIG. 16 is a valve assembly having an alternate embodiment of a first and second end cap.

FIG. 16 is an alternatively preferred valve assembly 100. This configuration is very similar to the presently preferred embodiment except that a different first end cap 102 and second end cap 104 are utilized. The first end cap has a coaxial orifice connector 106 connected thereto that is substantially similar to the end plug provided in the presently preferred embodiment. The second end cap 104 lacks the manual shut off. The housing 108 is the same although other housings can also be utilized. In fact, in other embodiments, the housings may, or may not, surround the actuator 34 and encompass the actuator 34 as shown in FIGS. 1 and 16. Of course, electrical connections are made using the connection 90 through the housings in the preferred embodiments. Other electrical connections could also be utilized. The valve assembly may take the form of a box around one or more valve seats that is understood in the art.

Figure 17:
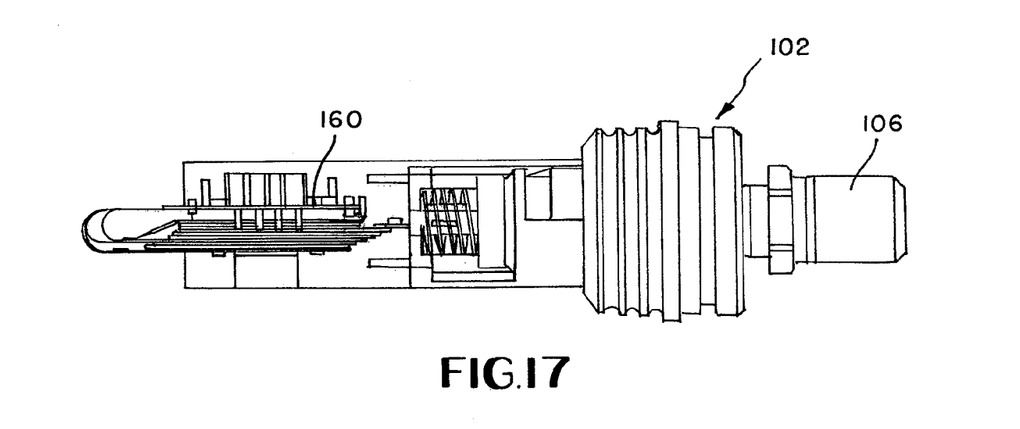
FIG. 17 shows the alternative first end cap connected to the holder actuator and poppet.
Figure 18:
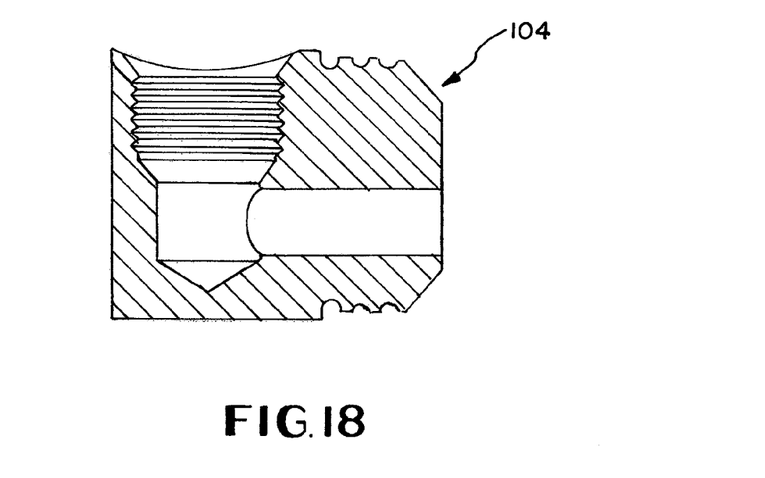
FIG. 18 is a cross-sectional plan view of the second end cap shown in FIG. 15.
Figure 19:
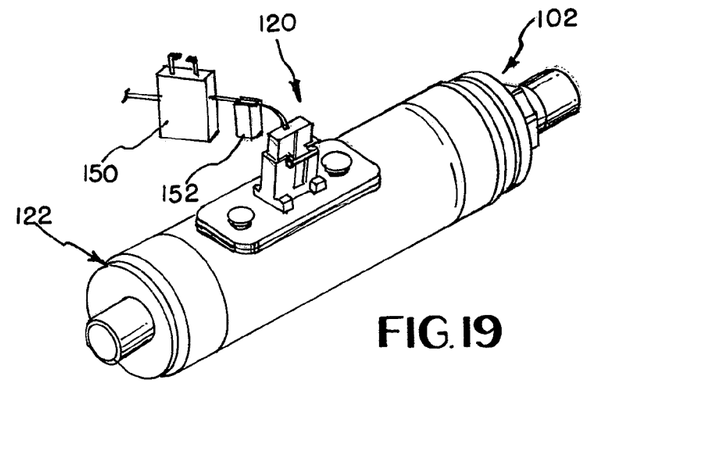
FIG. 19 is an alternative embodiment having an alternative embodiment second end cap.
Figure 20:
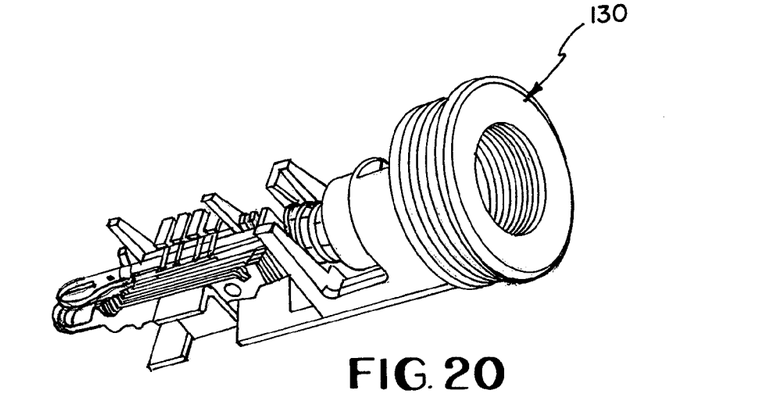
FIG. 20 is a alternative embodiment of a first end cap with the valve assembly.
Figure 21:
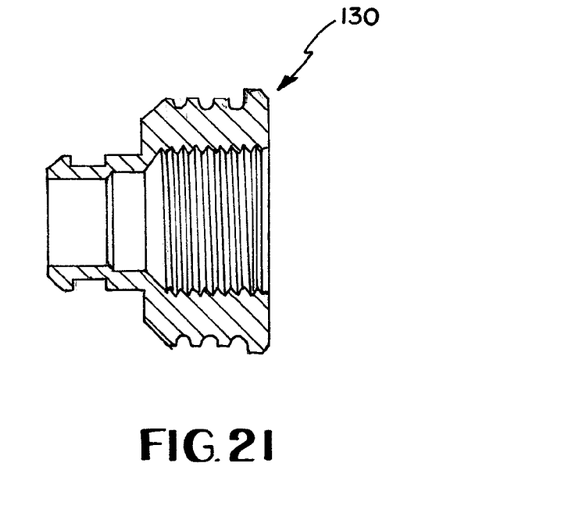
FIG. 21 is a side cross-sectional view of the first end cap shown in FIG. 19.

FIG. 19 shows yet another valve assembly embodiment 120. Although this has the same first end cap 102 as is shown in FIGS. 16 and 17, the second end cap 122 is slightly different. FIGS. 20 and 21 show a further embodiment of a first end cap 130. These embodiments are provided to show that there are various embodiments that can be utilized with the valve assembly without departing from the spirit of the valve assembly 10 of the present invention.

The current U.S. manufacturing requirements provide for an oven igniter to be kept on all the time. It is not unusual for igniters to need to be replaced about every five to seven years since they wear out. Specifically, over the life of the igniter, the resistance through the igniter increases and therefore the current through the igniter drops. In the current oven standard, the valve cannot be open when the current drops below 2.4 Amps but must be fully open when the current is about 2.9 Amps after the current passes through the igniter. It is believed that the degradation of the igniter increases most in the first three to five years. After an initial drop, the degradation of the igniter proceeds at a slower rate. Accordingly if a valve could be provided which operates at low amperages above 2.4 such as in a range of about 2.5 to 3.2 Amps, then an increased life of the igniter could be obtained.

FIG. 19 shows an igniter 150 connected to a circuit 152 which measures the current through the igniter 150 and then provides an appropriate switch to operate the valve assembly 120 intermediate an open or closed configuration depending on the output of the circuitry 152. Circuit 152 may not be necessary in all embodiments since the preferred actuator 34 has circuit 160 as a portion of the actuator.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A valve assembly comprising:
   a plug having a valve seat, said plug having an outermost perimeter defining a first cross sectional area spaced from the valve seat, said outer perimeter being larger than a perimeter of the valve seat;
   a holder cantileveredly connected to the plug;
   a remotely and electrically controlled actuator operably connected to the holder;
   a poppet connected to the actuator, said poppet driven by the actuator intermediate an open configuration wherein a fluid passes intermediate the valve seat and the poppet and a closed configuration wherein the poppet forms a seal relative to the valve seat, and said actuator at least assists in the poppet moving from the closed configuration to the open configuration;
   wherein the holder, actuator and poppet are bounded by a second cross sectional area parallel to the first cross sectional area when in at least one of the open and closed configurations with a fluid axis being perpendicular to the first and second cross sectional areas and the fluid passes by at least a portion of the holder in the direction of the fluid axis in the open configuration, and said first cross sectional area greater than the second cross sectional area, and said first cross section is opposite the valve seat relative to the poppet.

2. The valve assembly of claim 1 wherein the fluid passes by at least a portion of the actuator in the direction of the fluid axis in the open configuration.

3. The valve assembly of claim 2 further comprising a housing about at least a portion of the holder and actuator, said housing having an outlet and the fluid passing through the outlet in the open configuration.

4. The valve assembly of claim 1 further comprising a housing about at least a portion of the holder and actuator, said housing having an outlet and the fluid passing through the outlet in the open configuration and intermediate the housing and the holder.

5. A valve assembly comprising:
   a plug having a valve seat, said plug having an outer perimeter defining a first cross sectional area located towards a proximal end relative to the valve seat and spaced from the valve seat;
   a holder cantileveredly connected to the plug;
   an electrically controlled actuator operably connected to the holder and remotely operated;
   a poppet connected to the actuator, said poppet driven along a fluid axis by the actuator distally of the valve seat intermediate an open configuration with fluid passing intermediate the valve seat and the poppet and a closed configuration with the poppet forming a seal relative to the valve seat; and
   wherein when in the open configuration fluid passes in a direction of the fluid axis through the valve seat and past at least a portion of the holder with the outer perimeter being a largest outer perimeter relative to a perimeter defined about a cross section of the actuator and holder as taken along the fluid axis.

6. The valve assembly of claim 5 wherein when in the open configuration, fluid passes in the direction of the fluid axis past at least a portion of the actuator.

7. The valve assembly of claim 6 wherein when in the open configuration, fluid passes in the direction of fluid axis past the actuator.

8. The valve assembly of claim 7 further comprising a housing about at least a portion of the holder and actuator, said housing having an outlet and the fluid passing through the outlet in the open configuration.

9. The valve assembly of claim 5 wherein when in the open configuration, fluid passes in the direction of the fluid axis past the holder.

10. The valve assembly of claim 9 further comprising a housing about at least a portion of the holder and actuator, said housing having an outlet and the fluid passing through the outlet in the open configuration.

11. The valve assembly of claim 5 further comprising a housing about at least a portion of the holder and actuator, said housing having an outlet and the fluid passing through the outlet in the open configuration.

12. The valve assembly of claim 5 wherein the actuator operates along an actuator axis and the fluid axis is collinear with the actuator axis.

13. A valve assembly comprising:
   a plug having a valve seat disposed relative to a face of the plug, said plug having a largest outer perimeter defining a first cross sectional area opposite the face relative to valve seat said valve seat spread from the face;
   a holder connected to the plug;
   an electrically controlled actuator operably connected to the holder and remotely operated;
   a poppet connected to the actuator with the valve seat intermediate the poppet and the largest outer perimeter, said poppet driven along a fluid axis by the actuator intermediate an open configuration with fluid passing intermediate the valve seat and the poppet and a closed configuration with the poppet forming a seal relative to the valve seat and said is poppet also moved along the fluid axis from the closed to the open configuration by the actuator; and
   wherein when in the open configuration fluid passes in a direction of the fluid axis through the valve seat and past at least a portion of the actuator.

14. The valve assembly of claim 13 wherein the actuator further comprises a shape memory alloy member and fluid passes past at least a portion of the shape memory alloy member when in the open configuration.

15. The valve assembly of claim 13 wherein movement between the open and closed configurations is controlled with at least an electrical signal.

16. The valve assembly of claim 13 wherein the plug has a boss with the valve seat disposed thereon at a distal end of the plug.

17. The valve assembly of claim 16 wherein the actuator linearly moves the poppet from the closed to the open configuration.

18. The valve assembly of claim 16 wherein the holder connects to the plug at the boss.

19. The valve assembly of claim 18 wherein the boss has a channel which receives a portion of the holder therein with the holder extending cantileveredly from the boss.

20. The valve assembly of claim 13 further comprising a housing about at least a portion of the holder and actuator, said housing having an outlet and the fluid passing through the outlet in the open configuration.

* * * * *